United States Patent [19]

Iwako

[11] Patent Number: 4,706,005
[45] Date of Patent: Nov. 10, 1987

[54] CONTROL CIRCUIT OF DIRECT CURRENT SERVOMOTOR FOR FLOPPY DISK DRIVE

[75] Inventor: Akinobu Iwako, Saitama, Japan

[73] Assignee: Citizen Watch Co., Ltd., Tokyo, Japan

[21] Appl. No.: 848,713

[22] Filed: Apr. 4, 1986

[30] Foreign Application Priority Data

Apr. 9, 1985 [JP] Japan .............................. 60-074876

[51] Int. Cl.⁴ ............................................... H02P 6/02
[52] U.S. Cl. .................................... 318/603; 318/280; 318/430; 318/254; 360/73
[58] Field of Search ...................... 318/599–611, 318/138, 254, 256, 280, 281, 283, 284, 285, 306, 308, 314, 341, 317, 318, 385, 387, 391, 392, 400, 430, 431, 439; 360/70, 71, 73, 74.1, 74.2, 74.4, 77, 78, 81, 86

[56] References Cited

U.S. PATENT DOCUMENTS

| | | | |
|---|---|---|---|
| 4,066,935 | 1/1978 | Takaoka et al. | 318/138 |
| 4,123,779 | 10/1978 | Goldshmidt | 360/73 X |
| 4,190,860 | 2/1980 | Somers et al. | 360/73 X |
| 4,251,758 | 2/1981 | Pedersen et al. | 318/439 X |
| 4,338,556 | 7/1982 | Hetzel | 318/434 X |
| 4,362,976 | 12/1982 | Fujioka et al. | 318/434 X |
| 4,423,443 | 12/1983 | Ucki et al. | 360/74.1 |
| 4,454,458 | 6/1984 | Holland | 318/254 |
| 4,497,001 | 1/1985 | Hayashi et al. | 360/74.2 |
| 4,607,300 | 8/1986 | Aoyagi et al. | 360/74.1 |
| 4,629,951 | 12/1986 | Weber et al. | 318/434 X |

Primary Examiner—Charles D. Miller
Assistant Examiner—Shik Luen Paul Ip
Attorney, Agent, or Firm—Koda and Androlia

[57] ABSTRACT

A control circuit of a direct current servomotor which constantly rotates a floppy disk. A drive pin is connected to a motor shaft of the direct current servomotor, and the floppy disk is driven to rotate at a such state that engagement of the drive pin with a drive hole of the floppy disk chucks up the floppy disk on the servomotor. The direct current servomotor consists of a brushless motor that hall devices detect its magnet pole position and choose among the excited phases of the stator coils. The motor rotates to the reverse direction at the start-up by means of inversion of the input electric current flow to the hall devices in a short while and change-over of the magnet pole detecting direction. The reverse rotation at the motor start-up moves the drive pin on to the rear end of the drive hole, and the subsequent normal rotation firmly starts up the motor. Furthermore, the kinetic energy provided in the run-up period in which the drive pin moves in the drive hole firmly starts up to rotate the floppy disk.

2 Claims, 10 Drawing Figures

CONTROL CIRCUIT OF DIRECT CURRENT SERVOMOTOR FOR FLOPPY DISK DRIVE

BACKGROUND OF THE INVENTION

1. Field of The Invention

The present invention relates to a control circuit of a direct current servomotor for a floppy disk drive, and more particularly to a control circuit which improves starting capability for initial rotation of a floppy disk.

Furthermore, the present invention also relates to a control system of a spindle motor for a floppy disk drive which drives and rotates a magnetic disk by means of engaging a drive pin with a drive hole of the magnetic disk, and more particularly to a motor control system which is improved to obtain initial large start-up torque.

2. Description of The Prior Art

It is well-known that there is a floppy disk drive which drives and rotates the floppy disk that magnetic recording medium is coated on the surface of deflectable plastic thin film and which performs read/write operation of information at a requested track position by means of traveling read/write heads toward the radial direction of the floppy disk. The floppy disk drive is of wide use as an external data storage device for computors.

In recent years, this kind of floppy disk drive has been not only requested to be designed its total system with a low cost, small sizes and a little consumption of electric power, but also to increase its initial start-up torque without any increased cost, large sizes nor much consumption of electric power.

In the ordinary cases, a spindle motor consisting of direct current servomotor drives and rotates the floppy disk with a constant rotating speed, and in order to make an initial start-up of the floppy disk drive firmly the spindle motor is required sufficient torque at the start-up of the disk. The start-up operation is performed in such a state that a drive pin mounted on the shaft of the spindle motor is engaged with a drive hole provided in the hub fixed on the central portion of the magnetic disk and the shaft of the spindle motor and the hub of the magnetic disk are firmly chucked together. The spindle motor is required large start-up torque for overcoming the disk rotating load at the start-up of the spindle motor.

In order to increase the start-up torque of the motor, strong rotor magnet or increase of electric current and the number of turns in the drive coil must be considered, but these cause in volume of the motor, increase of cost or increase of electric power consumption.

SUMMARY OF THE INVENTION

Accordingly, it is an object of the present invention to provide a control system which firmly starts a spindle motor without necessity of large electric power.

In keeping with principles of the present invention, the object is accomplished with a control circuit in which provided are an initial reverse circuit for inverting the detecting direction of magnet pole position detectors at an initial motor start-up, and a timer determining the reverse rotating interval in the initial stage, and the motor is started up and accelerated in such back and forth period so that the vigorous conflict force of a drive pin to the front edge of a drive hole can provide a large torque against the floppy disk.

In the present invention, therefore, the spindle motor does not rotate to the normal direction but to the reverse direction for a certain time at its started-up or stopped-off, and the drive pin of the spindle motor initially or finally moves to the very end of the drive hole of the floppy disk. In the next stage after the certain time elapses, when the spindle motor rotates to the normal direction, since the drive pin runs idle in the drive hole, the spindle motor firmly starts up with normal rotation in such run-up period, and even the spindle motor with comparatively small start-up torque can firmly start up and rotate the magnetic disk with its idling dynamic force.

Practically, the drive pin and the drive hole take an optional position relating therebetween in the static state or in such a state that the floppy disk is inserted into the disk drive, but in the present invention the initial inverse rotation of the spindle motor firmly moves the drive pin onto the rear end of the drive hole. In case the drive pin stays in the position at the rear end of the drive hole in its initial stage, even if the spindle motor cannot rotate to the reverse direction because of its low start-up torque, as the drive pin is already positioned at the rear end of the drive hole from the first stage at this time, normal rotation of the spindle motor after the certain time elapses enables the spindle motor to secure the firm run-up period for its rotation to the normal direction, that is, the drive pin to secure the period to run idle in the drive hole, and, at any rate, the run-up action can be obtained for the rotation to the normal direction.

DETAILED DESCRIPTION OF THE EMBODIMENT

Figure 1:
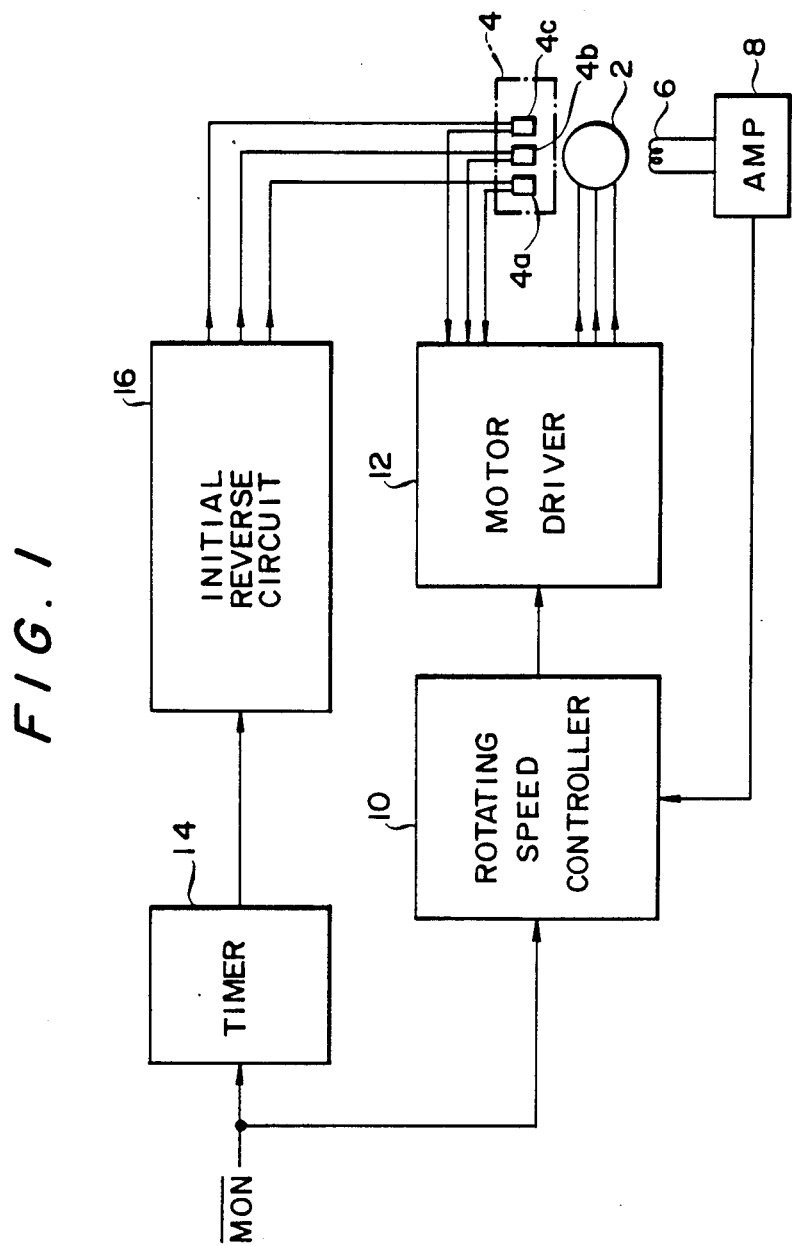
FIG. 1 is a schematic block diagram showing a composition of a spindle motor control circuit in accordance with the teachings of the present invention.

FIG. 1 shows a block diagram of the function in accordance with the teachings of the present invention. In this embodiment, described about is a three phase brushless direct current servomotor as a spindle motor. In other words, the motor 2 is driven and rotated by suitable change-over of exciting phases in stator coils by use of signals of hall devices 4a, 4b and 4c as three pieces of pole position detector 4. In order to detect the rotating speed of the motor applied is an FG coil 6 which generates detecting signal of a frequency in proportion to the rotating speed of the rotor, and this signal is amplified by an amplifier 8 to be fed to a rotating speed controller 10.

MON signal is applied as the start-up and stop signal to the motor. In directs to start up (rotate) the motor with the low level and to stop the motor with the high level. The rotating speed controller 10 performs fixed rotating speed operation in accordance with the rotating speed signal obtained from the FG coil 6. The MON signal with the low level outputs its effective signal, and the one with the high level provides zero outputs to stop driving the motor. A motor driver 12 does not only amplify the output from the rotating speed controller 10 but also changes over the exciting phases in accordance with the signals of hall devices 4a, 4b and 4c. An initial reverse circuit 16 supplies power to the hall devices 4a, 4b and 4c, and change-over of power source poles inverts the outputs of the hall devices 4a, 4b and 4c so that the motor 2 rotates to the reverse direction in initial stage of the motor start-up.

A timer 14 is started when the MON signal falls down, that is, when the motor begins to rotate, and directs to the initial reverse circuit 16 to reversely rotate the motor only in a set time. In other words, in the embodiment, the motor rotates in the reverse way at the start-up to be put in the non-chucking state, and, immediately after, starts up to rotate to the normal direction to obtain the run-up action.

On the other hand, if necessary, it is possible that when stop of the motor rotation by stop signal a reverse drive runs the magnetic disk to be rotated in idle by inertia, in other words, the motor stops with its drive pin moved on to the rear end of the drive hole, and the motor can be started with normal rotation in the non-load state at the next start-up to drive the magnetic disk.

Described hereinafter will be a chucking portion of the motor shaft and the disk hub.

Figure 2:
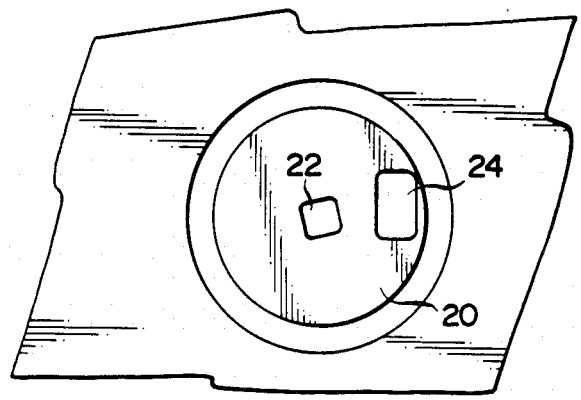
FIG. 2 is a top plan view of a chucking hub of magnetic disk to be applied in the present invention.
Figure 3A:
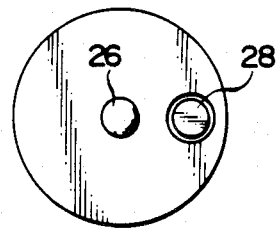
FIG. 3A and FIG. 3B are a schematic plan view and a sectional side elevation showing a chucking portion of the spindle motor.
Figure 3B:
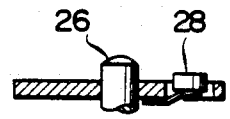
Figure 4:
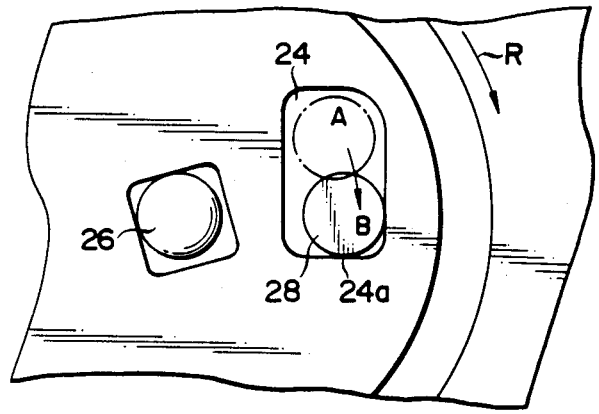
FIG. 4 is an illustration describing an engaging relation between a drive pin on the spindle motor and a drive hole on the the floppy disk at the start-up of the spindle motor.

FIG. 2 is a top plan view showing the hub of the magnetic disk, and FIG. 3A and FIG. 3B are a top plan view and a sectional side elevation showing a chucking portion of the spindle motor and showing a device for a 3.5 inch microfloppy disk. The spindle 26 and the drive pin 28 of the spindle motor respectively introduce into a center hole 22 and a drive hole 24 of the magnet disk 20 to drive and rotate the disk 20. FIG. 4 is a top plan view showing the transition of the chucking state at the start-up; A symbol A shows the non-chucking state before the drive pin 28 is correctly positioned into the drive hole 24, and a symbol B shows the chucked state.

In other words, in the present invention, taking advantage that there is little load torque put on the spindle motor between the A and B states, and making good use of the vigorous conflict force of the drive pin 28 to the front edge 24a of the drive hole 24 at the B state after the motor is naturally accelerated in the section between A and B, the motor obtains large start-up torque and the magnetic disk is driven and rotated in the normal direction of an arrow R.

Figure 5:
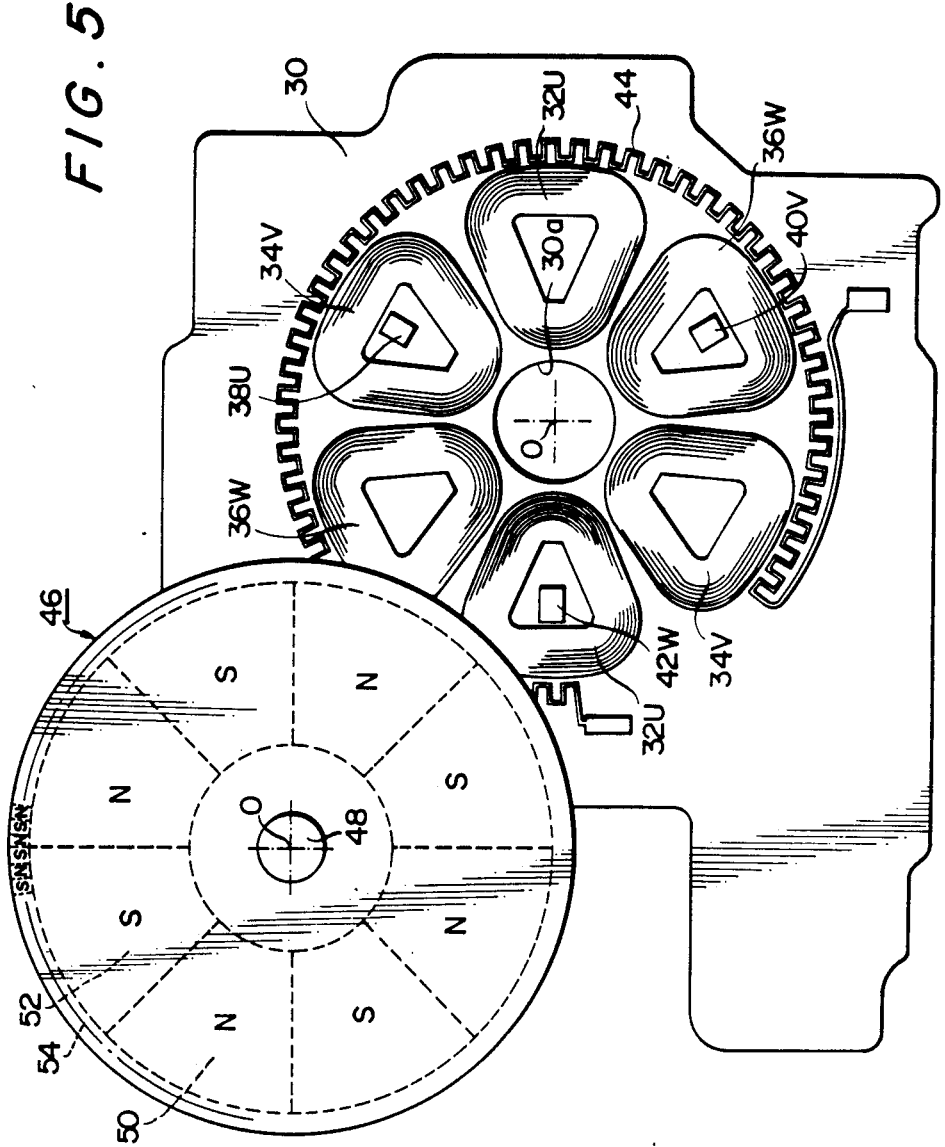
FIG. 5 is a detailed top plan view of a preferred embodiment which the control circuit of the spindle motor of the present invention is applied in, and, more specifically, an exploded view showing a positional relation between stators and a rotor.

FIG. 5 shows a positional relation between a rotor and a stator of the spindle motor for a concrete floppy disk drive, wherein a control circuit is used in accordance with the teachings of the present invention.

In FIG. 5 six stator coils are arranged in a ring shape around a rotor shaft hole 30a on a spindle motor base board 30, and two stator coils form up as a pair. In other words, formed are U phase stator coil pair 32U, V phase stator coil pair 34V and W phase stator coil pair 36W. Furthermore, circuits of the rotating speed controller and the motor driver, which are hereinabove described above, are printed on the spindle motor print circuit board 30.

In order to change over the respective phases of the respective stator coils 32 through 36 with the basis of the rotor phases, in the embodiment, the hall devices 42W, 38U and 40V are repectively provided inside on the one side of the stator coils 32U, 34V and 36W.

On the spindle motor print circuit board 30, furthermore, the FG coil 44 is printed on the outer circumference of stator coils.

The rotor of the spindle motor is shown with a numeral 46 in FIG. 5. A rotor magnet 52 is attached on the rear surface of a yoke 50 which is fixed to a rotor shaft 48, and an FG magnet is arranged in a ring shape therearound. The rotor magnet 52 is magnetized in eight poles around the circumference direction. The FG magnet 54 includes numbers of magnet poles corresponding to the number of windings of the FG coil 44 and being magnetized along the circumference direction.

Accodingly, as evident from FIG. 5, it is understood that the rotor 46 is driven to rotate to a predetermined direction by electromagnetic driving force generated between the excited stator coils 32 through 36, excitation of which are performed with a predetermined combination of phases, and the magnetic poles of the rotor magnet 50. At the rotation of the rotor magnet 50, the respective magnet poles pass over the hall devices 38 through 42, when each of the hall devices 38 through 42 outputs requested position detecting signal, and this detecting signal changes over the excited phases of the respective stator coils 32 through 36 to operate the rotor 46 with continuous fixed speed rotation.

The fixed speed rotation control mentioned above is performed by rotating speed detecting signal which is generated by combination of the FG coil 44 and the FG magnet 54 so that the fixed rotating speed can be obtained.

Figure 6:
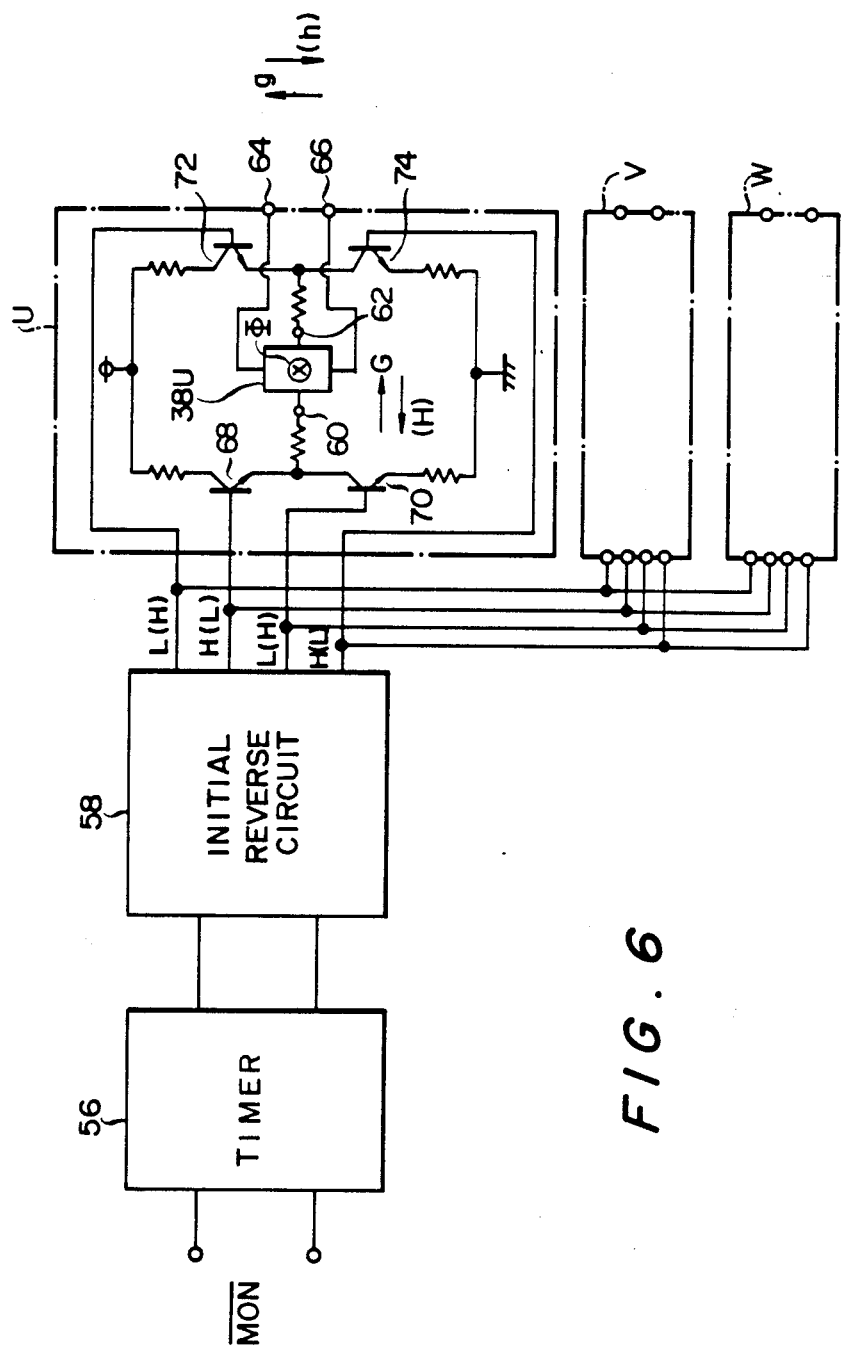
FIG. 6 is an illustration describing a circuit which changes over detecting directions of hall devices.

In FIG. 6 shown therein is a concrete circuit composition whereby changed over is magnetic pole detecting signal for the respective hall devices 38U, 40V and 42W shown in FIG. 5. In this circuit, as the timer 56 inverts the magnetic pole detecting directions of the hall devices at a certain interval at the start-up with the basis of MON signal, and the initial reverse circuit 58 switches over its outputs, the detecting directions of the respective hall devices are inverted.

As generally known, the hall device 38U can invert the direction of output voltage from output terminals 64 and 66 in accordance with the direction of the electric current flowing between input terminals 60 and 62.

In FIG. 6, for example, when magnetic flux $\theta$ penetrates through the hall device 38U downward in the vertical direction, as is shown in Figure, supply of the electric current shown in an arrow G between the input terminals 60 and 62 generates the voltage shown in an arrow g between the output terminals 64 and 66. On the other hand, the electric current flow of an arrow H in the reverse direction between the input terminals 60 and 62 generates the voltage shown in an arrow h between the output terminals 64 and 66, as long as the direction of the magnetic flux $\theta$ stays unchanged. Accordingly, inversion of the electric current or voltage direction supplied to the hall device 38U inverts the magnetic pole detecting direction of the hall device 38U, if the rotor and the stator coils are relatively positioned in the same states, so that the rotor can be driven to the reverse direction.

In order to change over the electric current input to the hall device 38U, in the embodiment, a transister 68 is connected between the input terminal 60 and the power source, and a transister 70 is connected between the input terminal 60 and the ground. In the same manner, transisters 72 and 74 are respectively connected among the input terminal 62, the power supply and the ground. Control of the on/off operation in these four transisters 68 through 74 by the initial reverse circuit 58 optionally chooses either one of the current flowing directions G and H between the input terminals 60 and 62.

In the embodiment, the initial reverse circuit 58 outputs the L or H level signal, as is shown in Figure, in order to provide to the hall device 38U the electric current with G direction, and, on the other hand, the initial reverse circuit 58 supplies the signals shown in parentheses to the respective transisters 68 through 74 in order to provide to the hall device 38U the input electric current with the H direction.

Figure 7:
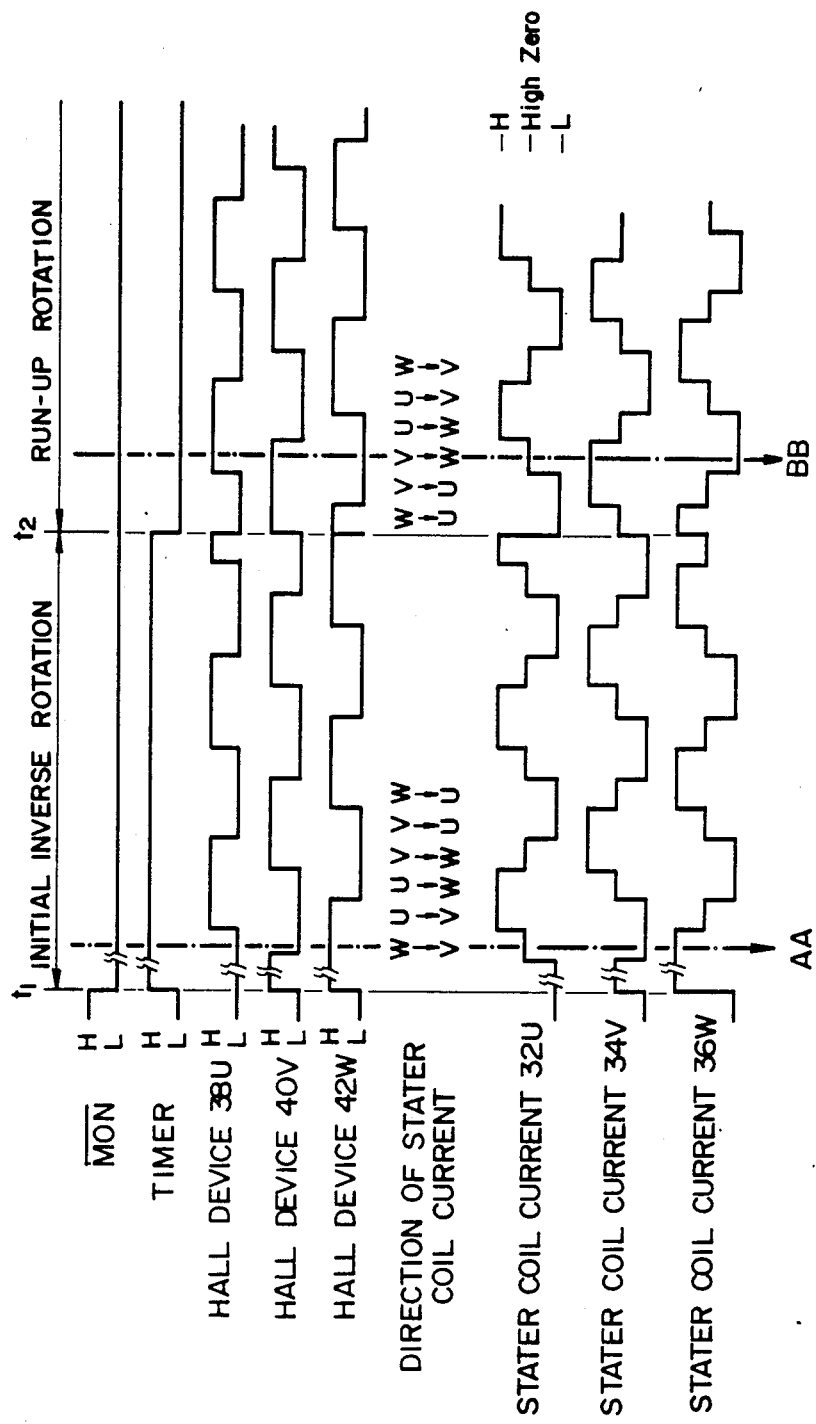
FIG. 7 is a timing chart describing about the inverting action of the spindle motor shown in the embodiment of FIGS. 5 and 6.

In FIG. 7 shown therein is the inverting and running-up actions at the start-up in the embodiment. When the motor-on signal MON changes from the H level into the L level at a time $t_1$, the floppy disk drive begins to rotate the spindle motor to prepare for the read/write action. At this start-up, in the present invention, the spindle motor is driven to rotate in the reverse direction only in a predetermined short while at the start-up, as is previously described about, so that it moves its drive pin to the rear end of the drive hole shown in FIG. 4A, as is also described about previously.

After the reverse rotation in the short time moves back the drive pin to the predetermined position to secure the requested run-up distance, the spindle motor is changed its rotation to the normal direction at a time $t_2$, and low start-up torque could run sufficiently preferable start-up action so that kinetic energy stored at the run-up can firmly drive and rotate the floppy disk.

Accordingly, the floppy disk can be firmly started its rotation even if it has large static friction in its static state. The large static friction in the static state of the floppy disk shows one example that the head sticks to the surface of the floppy disk.

In order to certain time established at the start-up, in FIG. 7, at the time $t_1$ the motor-on signal is supplied to the timer 56 consisting of one shot circuit, and the timer 56 outputs the H level signal in the short time until the time $t_2$, as is shown in Figure.

The initial reverse circuit 58 outputs the detecting direction change-over signal, which is shown in the parentheses in FIG. 6, with the basis of the H level output from the timer 56. Consequently, the hall device, for example, 38U in FIG. 6, outputs the signal with the direction shown in "h" through the output terminals 64 and 66. At this time, the outputs from the respective hall devices 38U, 40V and 42W are combined as shown in FIG. 7.

In accordance with the combination of the outputs from the hall devices 38 through 40 the electric currents of the stator coils 32 through 36 are combined as shown in FIG. 7, and the combination of the respective phases provides the flowing directions of the electric current for the stator coils in Figure.

As described hereinabove, the spindle motor is controlled to be inverted in the short while at the motor start-up by the output from the timer 56, and the drive pin can be firmly moved on to the rear end of the drive hole as is shown for A in FIG. 4.

At this time, there occurs a case that the spindle motor is unable to rotate to the reverse direction when the floppy disk does not only receive a large load but also the drive pin already stays in the position at the rear end of the drive hole at the start-up. In this case, however, since the drive pin is already positioned at the rear end of the drive hole, no more reverse rotation is required at this time.

In the next stage of the time $t_2$, the timer 56 changes its output over to the L level, and the outputs from the respective hall devices are inverted, as is evident from FIG. 6. Accordingly, with the basis of the inversion of the output for the hall devices inverted are the respective electric currents for the respective stator coils, and the combination and the direction of the stator coil currents are obtained as are shown in FIG. 7. The directions of the stator coil currents at this time are combined to drive and rotate the spindle motor in the normal way.

In order to describe the inverting action mentioned above shown in FIGS. 8 and 9 are the stator coil currents at the positions AA and BB in FIG. 7 wherein the positional relation between the rotor magnet 52 and the respective stator coils 32 through 36 consists in the same manner.

Figure 8:
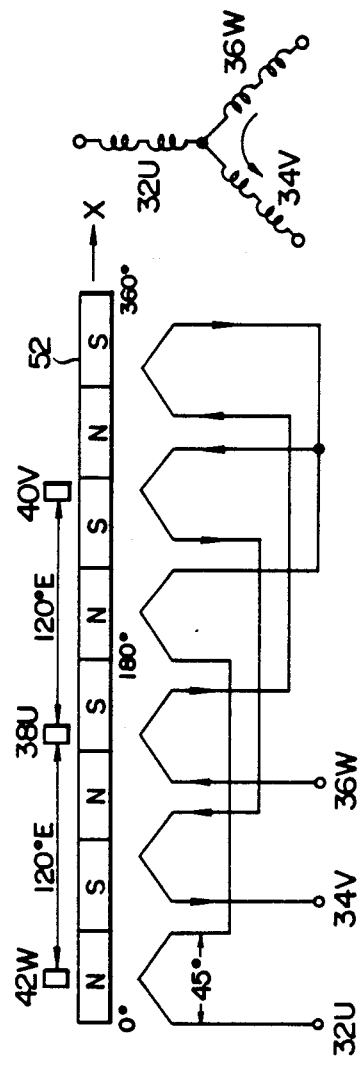
FIG. 8 is an illustration describing a state of stator coils put in the temporary inverted conditions at its start-up.

FIG. 8 shows an electric current flow at the time AA in FIG. 7. The stator coil current flows from the stator coil 36W to 34V, as is shown in Figure, and it is understood that the rotor and the rotor magnet 52 move to the right as is shown in arrow X, which indicates the inversive rotation at the motor start-up.

Figure 9:
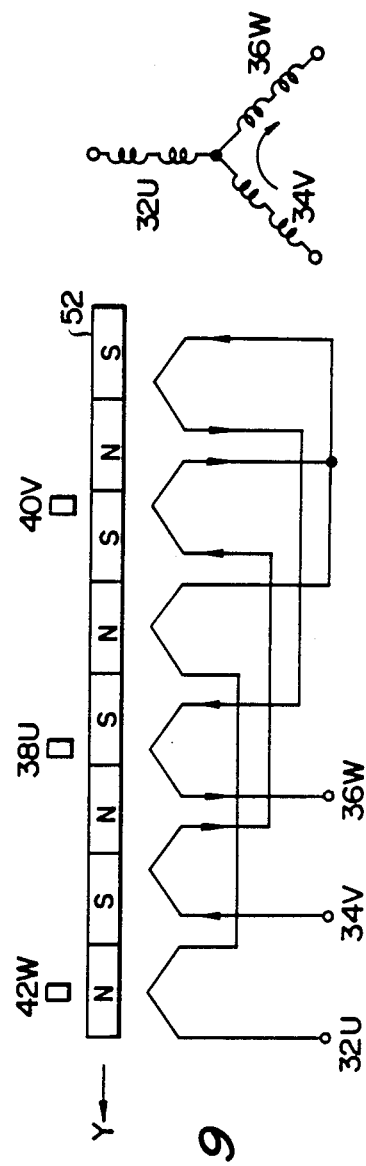
FIG. 9 is an illustration describing a run-up state at the normal rotation of the motor in the same phase relation with the one in FIG. 8.

On the other hand, as shown in FIG. 9, since the output voltage of the respective hall devices 38 through 42 is inverted at the time BB when the rotor and the stators stay at the exactly same positional relation with time AA, the rotor coil current flows from the stator coil 34V to 36W, and it is understood that the rotor and the rotor manget 52 move to the left as is shown in an arrow Y, which shows the normal rotation of the motor.

In the present invention, therefore, the run-up period can be established ro release the drive pin from the drive hole without fail at the start-up of the spindle motor so that the motor can be easily started without any load of the floppy disk. Furthermore, since the drive pin can engage with the drive hole with sufficient accelerating force, the floppy disk can be started to rotate with this sufficient accelerating force and a spindle motor having a comparatively smaller torque can start up the floppy disk with sufficient satisfaction.

As described heretofore, according to the present invention, the spindle motor having large start-up torque can be easily provided without higher cost, larger sizes nor more consumption of electric power.

What is claimed is:

1. A control circuit of a direct current servomotor for a floppy disk drive which includes a spindle motor having a stator and rotor to rotate a floppy disk, a plurality of magnet pole position detectors fixed on the stator for detecting a magnet pole position of the rotor in order to selectively change over the stator coil exciting phases of said spindle motor, an FG coil generating a frequency signal in proportion to the rotor rotating speed of said spindle motor, a rotating speed controller and a motor driver controlling said spindle motor at a fixed rotating speed with the basis of the rotating speed detecting signal supplied from said FG coil, improvement of which comprising:

a timer outputting timer signal by means of counting a predetermined certain time set up with said timer after application of motor start-up signal, said time being established longer than the time when a drive pin connected with a motor shaft of said spindle motor moves onto the rear end of a drive hole of the floppy disk; and an initial reverse circuit inverting the detecting direction of said magnet pole position detectors for the predetermined time after the motor start-up, whereby said spindle motor can be drive to rotate to the reverse direction for the predetermined time after the motor start-up.

2. A control circuit of a direct current servomotor for a floppy disk drive according to claim (1), wherein said magnet pole position detectors consist of hall devices, and said initial reverse circuit controls to invert the input electric current to the hall devices.

* * * * *